(No Model.) 2 Sheets—Sheet 1.

L. COURLANDER.
DEVICE FOR MEASURING CIRCLES AND OVALS.

No. 352,520. Patented Nov. 16, 1886.

Witnesses.
Robt. A. Blake
Chas. S. Woodroffe.

Inventor:
Louis Courlander:
per Phillips & Leigh
Attorneys.

N. PETERS, Photo-Lithographer, Washington, D. C.

(No Model.) 2 Sheets—Sheet 2.

L. COURLANDER.
DEVICE FOR MEASURING CIRCLES AND OVALS.

No. 352,520. Patented Nov. 16, 1886.

Witnesses.
Robt. A. Blake
Chas. S. Woodroffe.

Inventor:
Louis Courlander.
per Phillips & Leigh
Attorneys.

N. PETERS, Photo-Lithographer, Washington, D. C.

UNITED STATES PATENT OFFICE.

LOUIS COURLANDER, OF CROYDON, COUNTY OF SURREY, ENGLAND.

DEVICE FOR MEASURING CIRCLES AND OVALS.

SPECIFICATION forming part of Letters Patent No. 352,520, dated November 16, 1886.

Application filed April 27, 1886. Serial No. 200,280. (No model.) Patented in England November 18, 1885, No. 14,131.

*To all whom it may concern:*

Be it known that I, LOUIS COURLANDER, a subject of the Queen of Great Britain, and residing at Croydon, in the county of Surrey, England, have invented an Improved Device for Measuring Circles and Ovals, (for which I have obtained a patent for the United Kingdom of Great Britain and Ireland, No. 14,131, dated November 18, 1885,) of which the following is a specification.

My invention relates to an improvement in the construction of instruments for measuring the head, wrist, arm, neck, or such other objects the outline of which approximates in plan to that of a circle or oval. The head or the wrist, for instance, may be easily measured with an ordinary tape-measure, and the girth accurately ascertained by this very simple and well-known method; but the operation gives the measurer nothing more than the girth. It gives no intimation of the shape of the head or of the wrist. A hat or a bracelet may be made to the exact linear measurement around the head or the wrist, as the case may be, and yet not fit, because the shape has not been followed by the hatter or by the jeweler, but only the linear measurement.

My invention supplies an instrument which not only readily ascertains the linear measurement, but ascertains the exact shape along the line of measurement, indicating the shape at the same time, so that it can be recorded or copied at the time. If it is not convenient to copy the shape at the time of measuring, the indications on the scales of the instrument may be recorded and the instrument set thereto at any future date, when it will reproduce the shape.

I attain the object of my invention by the mechanism illustrated in the following figures, in which—

Figure 1:
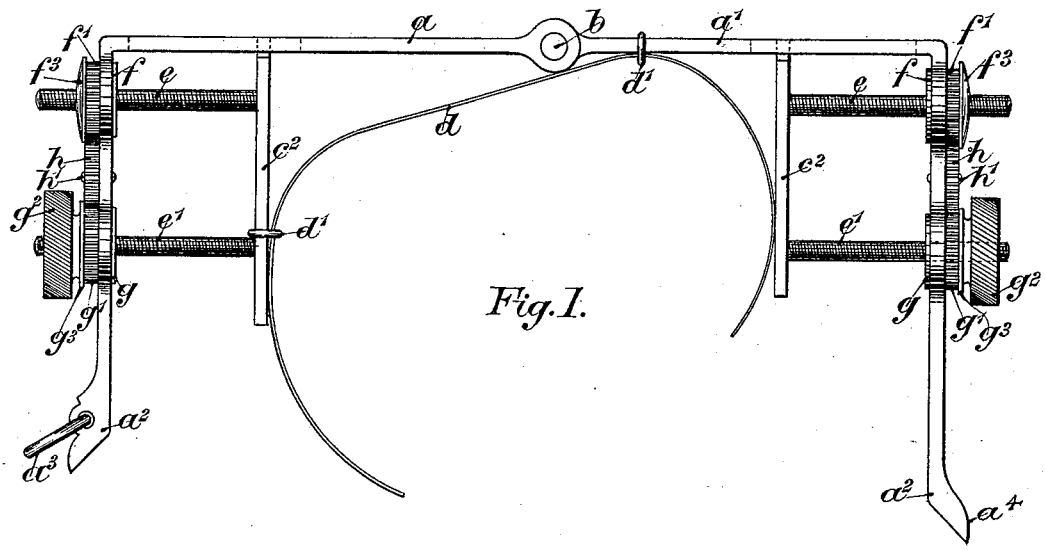
Figure 2:
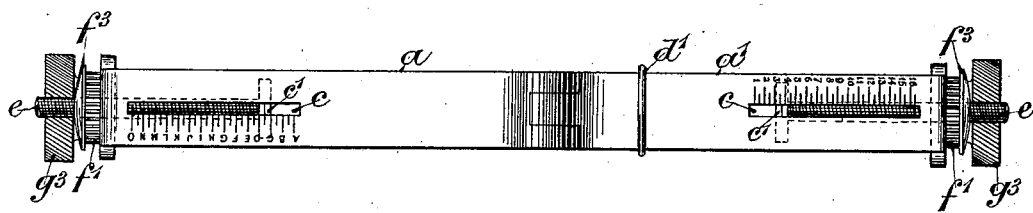
Figure 4:
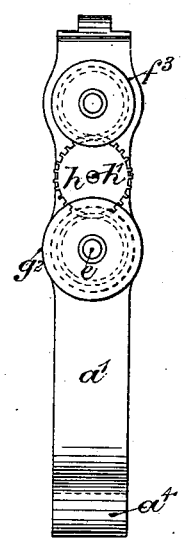
Figure 3:
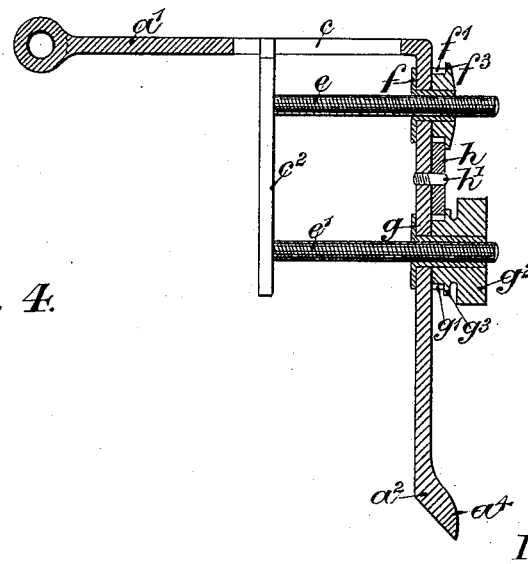
Figure 5:
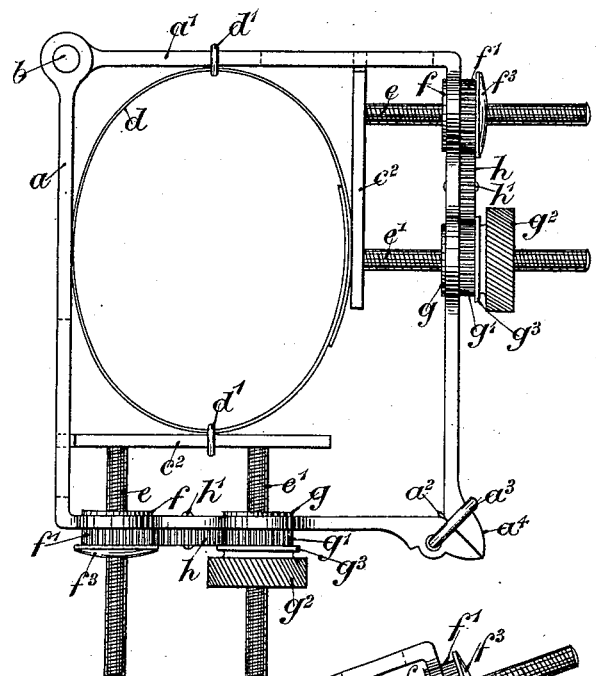
Figure 6:
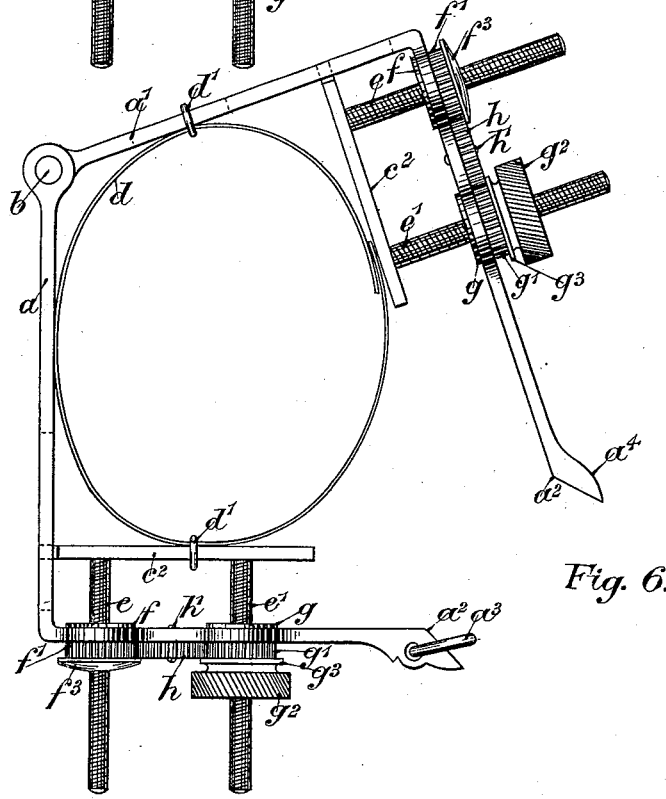

Figure 1 shows a measuring-instrument made according to my invention opened to its full extent before being applied to the object to be measured—*e. g.*, a lady's wrist. Fig. 2 is a plan of Fig. 1. Fig. 3 is a sectional plan of the right-hand half of the instrument illustrated in Fig. 1. Fig. 4 is a side elevation of Fig. 3, looking at it from the right-hand side. Fig. 5 shows a measuring-instrument made according to my invention closed round the object to be measured, the shape of which the spring-band has assumed, which in this particular case—*e. g.*, that of a lady's wrist—is oval. Fig. 6 shows the same, but partly open, as it would be when being removed from the wrist.

The frame of the instrument consists of two parts, $a$ $a'$, hinged together at $b$, and which, when closed, produce a square, or nearly so, the hinge $b$ and point of opening being at corners of the frame diagonally opposite to each other. The two ends $a^2$ $a^2$ are extended outward and their contacting faces sloped, as shown, for the purpose of making a neat junction, as well as to provide a convenient method of fastening the closed frame. One of the ends is accordingly furnished with a loop, $a^3$, which is passed over the convex surface $a^4$ to keep the frame closed.

In each side of the frame adjoining the hinge I form a slot, $c$. Each slot receives the nose $c'$ of a bar, $c^2$. One of these bars is longer than the other, for a reason to be explained farther on. Instead of slotting the frame, the ends of the bars $c^2$ may be shouldered and continued round the frame in any convenient way, it being necessary, for the purpose of my invention, that the ends of the bars should be visible close to the scales marked on the frame, for the purpose of easily reading off the indications of the instrument. The bars $c^2$ are advanced to or withdrawn from their respectively opposite (when the instrument is closed) sides, for the purpose of compressing the spring girthing-band $d$ or allowing it to expand by the devices described farther on.

For the purpose of preventing the band $d$ falling out of the frame and of keeping it in its place within the same, as well as for facilitating the use of the instrument, I provide two loops, $d'$. One of these is passed round one bar, $c^2$, and the band, the other embracing the opposite side of the frame and the bar. These loops are capable of sliding freely on the sides of the frame and bar, respectively, and allow the band to slide within them, for the purpose of permitting it to readily adjust itself to the outline of the object to be measured while it is suffering compression before the advancing bars $c^2$.

Instead of the two loops before mentioned, and illustrated herewith, I may use any other device for retaining the band within the frame without confining it too rigidly. For instance, I find that a longitudinal slot in the band where it touches the frame and a headed pin passed through said slot into the frame answer the purpose very well.

The devices for advancing and withdrawing the two bars $c^2$ are preferably duplicates of each other. As illustrated in the figures, each device consists of the following parts, viz: two screws, $e\ e'$, both fixed to the bar at points (approximately) equidistant from the center of the bar; two flanged sleeves, $f\ g$, screwed internally to receive the screws $e\ e'$, respectively, and capable of being rotated smoothly in holes formed through the respective sides of the frame. One of these sleeves—viz., $g$—is sufficiently long to receive a pinion, $g'$, and a milled head, $g^2$, upon its projecting end. The other sleeve, $f$, receives a pinion, $f'$, upon its outer end. Sleeve $f$ and pinion $f'$ are fast together, as are, likewise, sleeve $g$, pinion $g'$, and milled head $g^2$. An intermediate pinion, $h$, turns on a pin, $h'$, projecting from the frame, and gears with the pinions $f$ and $g$. Both screws are of the same pitch, and both pinions $f$ and $g$ of the same diameter. Each of the latter is flanged on the outside. These flanges $f^3\ g^3$ overlap the intermediate pinion and prevent it working off its pin.

I do not confine myself to the exact details described above, and illustrated herewith, of the devices for the purpose of advancing and withdrawing the bars $c^2$, inasmuch as I may vary the same without departing from the principle and substance of the invention, although the devices I have described give satisfactory results. It is evident that the two screws $e\ e'$ might be replaced by one central screw and a guide-rod on each side thereof. This arrangement would not require either the pinions $f'$ or $h$ or the pin $h'$, and if the ends of the bars $c^2$ are shouldered and made to embrace the sides of the frame it will suffice to use one screw to each bar and dispense with guide-rods.

The frame of the instrument is marked with a scale along the side of each slot, one scale being preferably marked with the letters of the alphabet and the other with figures. Any other signs may be used, provided they are distinguishable; otherwise the record of the indications of the instrument would be ambiguous. If both scales were marked with, say, figures, and the readings were 8–4, these readings might, unless acted upon by the artisan forthwith, be indistinguishable from a record 4–8; but if the reading is H4, and it is required to work to this, say, a month after the measure is recorded, there would be no doubt at all about setting the instrument to give the outline of the object the measuring of which gave the reading H4.

The nose $c'$ of each bar has a small notch cut in it to align with the markings of the respective scale. One bar $c^2$ is longer than the other, for the purpose of allowing the shorter bar to be advanced far enough to take the small diameter of a narrow elliptical or oval shaped object.

The method of using my invention is as follows: The frame is opened, and having been passed round the object to be measured the two ends of the band $d$ are placed one inside the other and the frame closed and fastened. The operator, continuing, if necessary, to hold the instrument in his left hand, advances the two bars $c^2\ c^2$, one by one, compressing the band $d$ until the exact girth and shape are obtained, when the frame is unfastened, releasing the band, and removed. The readings are then noted, and, if necessary or convenient, recorded.

I claim—

1. The combination of a square or an approximately square frame, produced by hinging together two pieces, each one bent to a right angle, and therefore forming two sides of said frame, with two bars parallel, respectively, to the two adjacent sides of the frame, each bar rigidly connected to a screw device working in the frame side parallel to said bar, by which device it can be advanced to or withdrawn from the opposite frame side, and with a spring measuring and girthing band contained in the quadrangular space between the two bars and the respectively opposite sides of the frame, said band being compressible by the advancement of and expansible after the withdrawal of said bars, substantially as and for the purpose described.

2. The combination, with the hinged frame and band compressing and releasing bars of an instrument for measuring circular or oval shapes or objects, of two scales and an index upon the end of each bar working over or by the side of said scales, respectively, substantially as and for the purpose described.

In testimony whereof I have hereunto set my hand.

LOUIS COURLANDER.

Witnesses:
    W. J. SKERTEN,
       17 *Gracechurch Street, London, E. C.*
    G. F. WARREN,
       *Notary Public, London.*